(12) United States Patent
Stanzione et al.

(10) Patent No.: US 9,633,039 B2
(45) Date of Patent: *Apr. 25, 2017

(54) INTERNET BASED DATA, VOICE AND VIDEO ALERT NOTIFICATION COMMUNICATIONS SYSTEM

(71) Applicant: Kaydon A. Stanzione, Sewell, NJ (US)

(72) Inventors: Kaydon A. Stanzione, Sewell, NJ (US); Lendell L. Oliver, Gorham, ME (US)

(73) Assignee: Kaydon Stanzione, Sewell, NJ (US)

( * ) Notice: Subject to any disclaimer, the term of this patent is extended or adjusted under 35 U.S.C. 154(b) by 224 days.

This patent is subject to a terminal disclaimer.

(21) Appl. No.: 14/496,013

(22) Filed: Sep. 25, 2014

(65) Prior Publication Data

US 2015/0058250 A1  Feb. 26, 2015

Related U.S. Application Data

(63) Continuation of application No. 11/580,383, filed on Oct. 13, 2006, now Pat. No. 8,849,908.

(60) Provisional application No. 60/726,114, filed on Oct. 13, 2005.

(51) Int. Cl.
| | |
|---|---|
| *G06F 15/16* | (2006.01) |
| *G06F 17/30* | (2006.01) |
| *G06Q 10/06* | (2012.01) |
| *G06Q 10/10* | (2012.01) |
| *H04M 7/00* | (2006.01) |
| *H04L 29/06* | (2006.01) |
| *H04L 29/08* | (2006.01) |
| *G06F 21/62* | (2013.01) |

(52) U.S. Cl.
CPC .... *G06F 17/30194* (2013.01); *G06F 21/6218* (2013.01); *G06Q 10/06* (2013.01); *G06Q 10/0637* (2013.01); *G06Q 10/103* (2013.01); *H04L 65/40* (2013.01); *H04L 67/025* (2013.01); *H04L 67/16* (2013.01); *H04M 7/0027* (2013.01)

(58) Field of Classification Search
USPC ...................................................... 709/204
See application file for complete search history.

(56) References Cited

U.S. PATENT DOCUMENTS

| | | | |
|---|---|---|---|
| 6,557,039 B1 * | 4/2003 | Leong | G06F 17/30233 707/E17.032 |
| 6,591,094 B1 | 7/2003 | Bentley | |
| 6,714,992 B1 * | 3/2004 | Kanojia | G06F 9/4411 702/122 |

(Continued)

*Primary Examiner* — Guang Li
(74) *Attorney, Agent, or Firm* — Stradley Ronon Stevens & Young, LLP

(57) ABSTRACT

A method of managing how electronic files are created, stored, viewed, edited, distributed, shared, controlled and archived by a plurality of users from a plurality of remote devices. The method includes creating a virtual space on a centralized server; transmitting at least one electronic file via wireless or wireline communication link to the centralized server that stores the file and file properties; receiving and processing the virtual space, file and file properties on the centralized server over the communication link; and assigning said file by an automated method to a plurality of authorized individuals and groups. The centralized server contains a user rights manager that identifies access control capabilities for a plurality of individuals and groups to act upon the file, and the assigning step is performed automatically without human intervention.

21 Claims, 13 Drawing Sheets

(56) References Cited

U.S. PATENT DOCUMENTS

| | | | |
|---|---|---|---|
| 6,735,601 B1 * | 5/2004 | Subrahmanyam | G06F 8/61 |
| 6,810,383 B1 | 10/2004 | Loveland | |
| 6,816,878 B1 | 11/2004 | Zimmers et al. | |
| 6,870,906 B2 | 3/2005 | Dawson | |
| 7,103,644 B1 | 9/2006 | Zhang et al. | |
| 7,110,918 B2 | 9/2006 | Celestini | |
| 7,181,690 B1 * | 2/2007 | Leahy | A63F 13/358 |
| | | | 715/706 |
| 7,370,273 B2 * | 5/2008 | Beyer | G06F 17/30067 |
| | | | 707/739 |
| 7,415,100 B2 * | 8/2008 | Cooper | H04M 3/527 |
| | | | 379/88.01 |
| 7,546,299 B2 * | 6/2009 | Benco | G06F 17/30194 |
| 7,840,600 B1 * | 11/2010 | Bhatia | G06F 17/30398 |
| | | | 707/783 |
| 2002/0042846 A1 * | 4/2002 | Bottan | H04L 29/06 |
| | | | 709/249 |
| 2003/0004763 A1 * | 1/2003 | LaBlanc | G06Q 10/06 |
| | | | 705/7.28 |
| 2004/0015821 A1 * | 1/2004 | Lu | G06F 9/542 |
| | | | 717/103 |
| 2005/0076095 A1 * | 4/2005 | Mathew | G06Q 10/06 |
| | | | 709/217 |
| 2005/0120058 A1 * | 6/2005 | Nishio | G06F 17/30233 |
| 2005/0232423 A1 * | 10/2005 | Horvitz | G06Q 10/10 |
| | | | 380/255 |
| 2005/0273346 A1 * | 12/2005 | Frost | G06Q 30/00 |
| | | | 705/316 |
| 2006/0156219 A1 * | 7/2006 | Haot | G06F 17/30017 |
| | | | 715/202 |
| 2007/0005713 A1 * | 1/2007 | LeVasseur | H04L 51/36 |
| | | | 709/206 |
| 2007/0180386 A1 * | 8/2007 | Ballard | G06F 17/30905 |
| | | | 715/744 |
| 2008/0244577 A1 * | 10/2008 | Le | G06F 8/63 |
| | | | 718/1 |
| 2009/0049422 A1 * | 2/2009 | Hage | G06F 8/10 |
| | | | 717/104 |
| 2012/0151377 A1 * | 6/2012 | Schultz | G06Q 10/103 |
| | | | 715/751 |

* cited by examiner

13
Communications

- Unified Messaging
- Alert Notification
- Satellite Communications
- SMS Text Messaging
- Voice over IP
- Radio interoperability
- Video Collaboration
- Intel Video Surveillance
- Instant Messenger
- Pagers
- Mobile wireless
- Discussion boards
- RSS feeds
- Email

14
Information Systems

- Global Intelligence
- Version & Document Control
- Portal / Content Manager
- Interoperability
- Identity Manager
- Process Control
- Continuity of Operations
- Secure / Vaulting
- Sensors
- Mapping– GIS/Meteorological

15
Process Manager

- Command & Control
- Executive Management
- Joint Operations
- Resource Coordination
- Automated Message Handling
- Project Management
- Workflow Manager
- Synchronization
- Personnel & Assets
- Activities / Tasks
- Audit Trails

Fig. 3

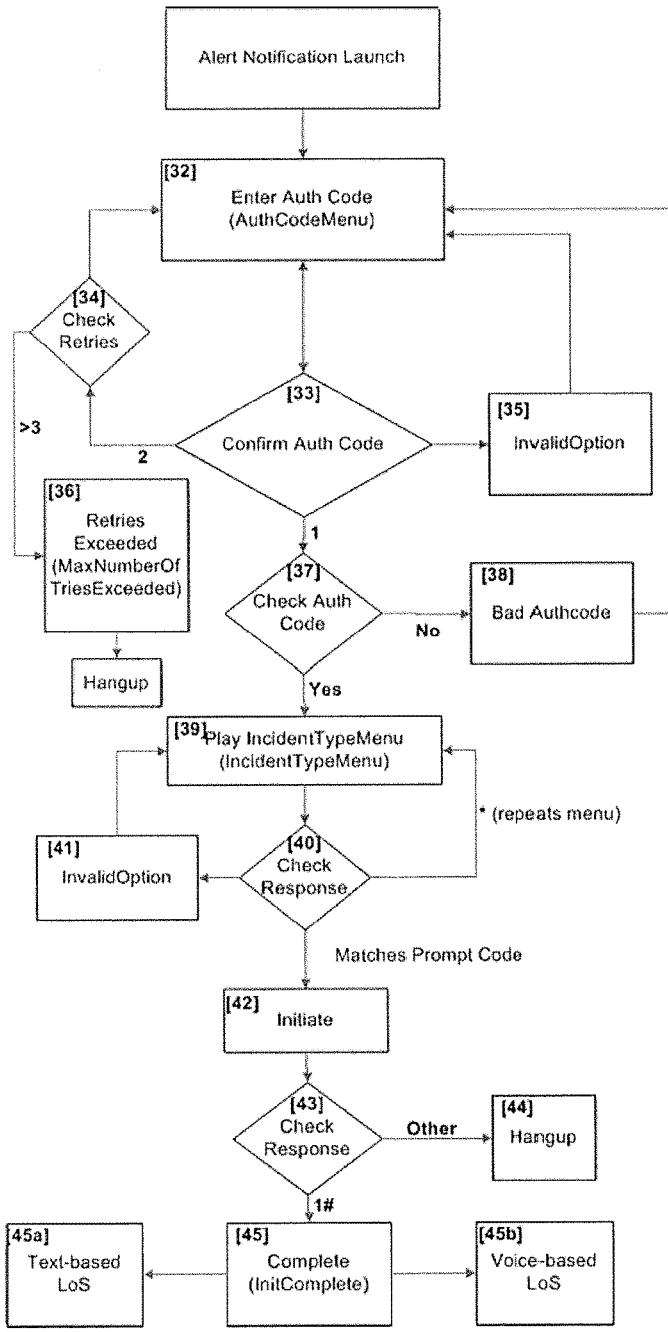

Process Flow Definitions

AuthCodeMenu
Message requesting authorization code or providing instructions

BadAuthCode
Checks for valid authorization code

ConfirmAuthCode
Seeks confirmation of authorization code

InvalidOption
Captures invalid input

MaxNumberOfTriesExceeded
Compares attempts against maximum number of times you can try to enter the required information

IncidentTypeMenu
Permits user-specific definitions for interactive voice or data response types

Initiate
Sends call flow information to appropriate communications and data WSDLs

InitComplete
Checks for completion of all required process flow items

Fig. 8

INTERNET BASED DATA, VOICE AND VIDEO ALERT NOTIFICATION COMMUNICATIONS SYSTEM

CROSS REFERENCE TO RELATED APPLICATIONS

This application claims the benefit of priority to U.S. patent application Ser. No. 11/580,383, filed on Oct. 13, 2006, which claims priority to U.S. Provisional Patent Application No. 60/726,114, filed on Oct. 13, 2005. The contents of both applications are hereby incorporated in this application by reference.

TECHNICAL FIELD

The present invention relates to the bi-lateral wireless and wireline communications of voice, data, video and imagery between remote devices, remote servers, or combinations thereof.

BACKGROUND OF THE INVENTION

Since the turn of the millennium, electronic communication is in constant transformation to meet growing global demand. The telecommunications industry is in the midst of a massive and rapid change. All electronic communication paths whether by wire line, cable or wireless are converging and collapsing into each other on common data and communications protocols. The separate domains of telephone, cable, wireless and the internet are rapidly converging into an integrated and ubiquitous communications platform tied together by the common electronic language of Internet Protocol (IP).

The integration of the telecommunications industry with the enterprise software industry presents extraordinary challenges in the development of new communication service solutions. The results of meeting these challenges include significantly improved services and lower life cycle costs. As stated by Ivan Seidenberg, CEO of Verizon Communications, "what used to be separate domains—phone calls, photos, music, movies, games, work—are now unified in a continuous stream of bits and bytes." Costs and barriers to entry into telecommunications systems will decline and the pricing for commodity voice and data services will be deflationary. With the capacity and capabilities of the IP based telecommunications networks rapidly increasing, the integration of value-added data applications are required to differentiate service offerings, increase revenues, prevent churn and to create new wealth.

The key challenges facing systems designers include:

Communications and information systems remain stovepiped. Some cross-department interoperability has begun and there exists a strong top-down organizational impetus to expedite improved collaboration between remote individuals and organizations across a plurality of remote and disparate devices. This sense of urgency is driven by lessons learned from catastrophic events such as the 911 NYC Trade Tower attacks, Hurricane Katrina and the war on global terrorism.

There is a strong cultural, and often language, barrier to inter-department communications. Even within intra-departments there are large barriers: most often between (a) the infrastructure technical staffs, (b) the analyst staffs, and (c) the operations staffs. Each group asserts that its own agenda is primary, with predictable turf wars and the results. The major consensus is that to overcome these organizational wars, a solution must be independent of hardware architecture, corresponding operating systems, and software language. In addition, the solution must be operable on existing electronic and machine devices and existing communication network infrastructure without any modification or acquisition of new equipment.

"The threat drives the need for change." Entities, whether organizations or individuals, make decisions based upon their own requirements and standard operating procedures, which requires information to be actionable in the way that meets their budgets, timeline and existing culture. The ability to present information in the way an entity can readily recognize it is crucial to success; this ultimately requires providing and processing global interoperability of communications and information systems to yield real-time situational assessment and a common operating picture necessary for improved decision making.

There is an emerging recognition that communications and information synergies take place at "intra-entity" relationships, creating "fusion centers" and centralized repositories with a two-way flow when the demand arises to extend operations to "inter-entity" relationships such as government, enterprise, or "tribal organizations."

Security of all communications and information transfer and storage is paramount. Security solutions must be capable of supporting any existing or emerging security-based encryption algorithms such as Automated Encryption Standard (AES), Federal Information Processing Standards (FIPS) and Virtual Matrix Encryption without modification to existing systems or infrastructure.

Employing digital convergence of communications and information provides real-time integration of voice, data, video, and images, thus enabling the present invention to uniquely and effectively meet current key and emerging requirement drivers as well as mission-specific requirements emanating from public and private sector entities and individual consumers.

Even with the emerging capabilities, the drawbacks of current systems are rooted in the lack of comprehensive integration between communications systems and information management systems. Predominantly, these drawbacks are exemplified by non-existent or limitations in: real-time two-way communications and management controls of a plurality of remote devices from any given remote device; identification of individual and event-specific workflow and content; object level rights management security; voice, data, video and image solutions delivered as services; and converged or unified automated message handling.

While some existing inventions provide partial capabilities as compared to the present invention, they lack the system architecture to provide robust features and benefits. The following patents in Table 1 appear to present certain functions and features that may provide components that address certain of the problems addressed above.

TABLE 1

| Pat. No. | Disclosed System Capabilities | Limitations in System Capabilities |
|---|---|---|
| 6,816,878 | Provides voice and data notification to recipients | Does not permit real-time two-way communications and acknowledgements with recipients or machine devices; does not enable identification of individual and event-specific data, tasks, projects, personnel assignment, documents, content management; lacks object level rights management security; lacks two-way communications and management control of remote machines and sensors; lacks converged voice, data and video solutions that are delivered as services; lacks converged automated message handling. |
| 6,591,094 | Automated user notification system that monitors and notifies a user when selected conditions occur | Does not permit real-time two-way communications and acknowledgements with recipients or machine devices; does not enable identification of individual and event-specific data, tasks, projects, personnel assignment, documents, content management; lacks object level rights management security; lacks two-way communications and management control of remote machines and sensors; lacks converged voice, data and video solutions that are delivered as services; lacks converged automated message handling. |
| 6,810,383 | Method and apparatus for electronically managing the assignment of tasks to be completed | Discloses two-way task management, but does not permit complete real-time two-way communications and acknowledgements with recipients or machine devices; does not enable identification of individual and event-specific data, tasks, projects, personnel assignment, documents, content management; lacks object level rights management security; lacks two-way communications and management control of remote machines and sensors; lacks converged voice, data and video solutions that are delivered as services; lacks converged automated message handling. |
| 6,870,906 | The system integrates a wireless device, a direct connect device and a telephone system for receiving an alarm condition from a remote device and then and passing that alarm through the PSTN | Discloses two-way telephony using the PSTN, but does not permit complete real-time two-way communications and acknowledgements with recipients or machine devices; does not enable identification of individual and event-specific data, tasks, projects, personnel assignment, documents, content management; lacks object level rights management security; lacks two-way communications and management control of remote machines and sensors; lacks converged voice, data and video solutions that are delivered as services; lacks converged automated message handling. |
| 7,110,918 | A machine monitoring system and method uses a machine monitoring device (MMD) connected to the monitored machine | Discloses one-way data receipt of monitored machines, but does not permit real-time two-way communications and acknowledgements with recipients or machine devices; does not enable identification of individual and event-specific data, tasks, projects, personnel assignment, documents, content management; lacks object level rights management security; lacks two-way communications and management control of remote machines and sensors; lacks converged voice, data and video solutions that are delivered as services; lacks converged automated message handling |
| 7,103,644 | A system for converged service creation and execution for voice oriented or for non-voice-oriented services. | Discloses converged voice, data and video solutions that are delivered as services, but does not permit real-time two-way communications and acknowledgements with recipients or machine devices; does not enable identification of individual and event-specific data, tasks, projects, personnel assignment, documents, content management; lacks object level rights |

TABLE 1-continued

| Pat. No. | Disclosed System Capabilities | Limitations in System Capabilities |
|---|---|---|
| | | management security; lacks two-way communications and management control of remote machines and sensors; lacks converged automated message handling |

Accordingly, there does not appear to be any known prior art methods, systems, or patents, that disclose or address the potential advantages of a comprehensive integration between communications systems and information management systems. Such systems should include real-time two-way communications and management controls of a plurality of remote devices from any given remote device; identification of individual and event-specific workflow and content; object level rights management security; voice, data, video and image solutions delivered as services; and converged or unified automated message handling. Such an innovative method and system has not been seen or achieved in the relevant art. The following describes such a method and system.

SUMMARY OF THE INVENTION

The above noted problems, which are inadequately or incompletely resolved by the prior art are completely addressed and resolved by the present invention.

A preferred embodiment of the present invention is a real-time converged communications and information system, said system comprising a central computer server, said central computer server having data storage; a plurality of remote user devices each having communications access to the central computer server, and said plurality of remote user devices also having communications access to each of the other plurality of remote user devices; encryption means to ensure that communications from any of the plurality of remote user devices is transmitted only to the central server or to one or more of the plurality of other remote user devices; a remote machine server, said remote machine server having communication access to each of the plurality of remote user devices; and a central communications server, said central communications server having communications access to each of the plurality of remote users devices, said central communications service having communication access to public and private communication networks.

Another preferred embodiment of the present invention is a real-time virtual workplace collaborative communications system, said system comprising at least one central server, said each at least one central server each having data storage; a plurality of remote user devices having communications access to the central server, and said plurality of remote user devices also having direct communications access to each of the other plurality of remote user devices; encryption means to ensure that communication from any of the plurality of remote user devices is transmitted only to the central server or to one of the plurality of other remote user devices; a content management computer server, said content management computer server having communications access to the central computer server, said content management server also managing the creation, storage, display and receipt of electronic data; a remote machine server, said remote machine server having communication access to each of the plurality of remote user devices; and a central communications server, said central communications server having communications access to each of the plurality of remote users devices, said central communications service having communication access to public and private communication networks.

In still another preferred embodiment of the present invention, a method for managing communication notifications transmitted to a remote device, wherein said notifications are of an occurrence of a pre-defined or calculated event which are maintained within a plurality of remote devices, the method comprising the steps of after the detection of an occurrence of a pre-defined or calculated event, transmitting an identifier through a communications link to a centralized server that stores the event and provides event definition; and receiving and processing the identifier by the centralized server over the communications link, wherein said centralized server includes a knowledge manager that identifies notification tasks, further wherein said tasks are performed automatically without human intervention, and said set of tasks are selected from at least one of a plurality of remote devices coupled to the centralized server, where the centralized server provides a task sequence, a sender-specific task and a receiver-specific task, and where a task manager automatically transmits the results of the tasks to a plurality of remote devices.

Yet a further preferred embodiment of the present invention is a method for providing electronic calendar events that are created, stored, viewed, edited, distributed, shared, controlled and archived by a plurality of users from a plurality of remote devices, the method comprising the steps of creating an event that contains calendar properties, said properties to include event description, modify existing events, check events sent, check events received, assign zero or more attendees, check attendee availability, identify for public or restricted viewing, set periodic reminders and communication methods, assign event manager, identify start and finish date and time, and assign notifications; transmitting said calendar properties via wireless or wireline communication link to a centralized server for storage; receiving and processing calendar properties on said centralized server over said communication link, wherein the centralized server containing a user rights manager that identifies access control capabilities for a plurality of individuals and groups to act upon said calendar event, and the centralized server further containing an automated method for notifying said attendees and event manager about said calendar properties automatically without human intervention.

The invention will be best understood by reading the following detailed description of the several disclosed embodiments in conjunction with the attached drawings that briefly described below.

BRIEF DESCRIPTION OF THE DRAWINGS

For the purpose of illustrating the invention, the attached drawings show several embodiments and aspects of several embodiments that are presently preferred. However, it should be understood that the invention is not limited to the precise arrangement, system flow, and instrumentality shown in the accompanying drawings.

FIG. 3 is a breakdown of the primary levels of service handled by an embodiment of the inventive system and method;

FIG. 8 is a flowchart of an embodiment of the inventive system and method for an automated communications process;

DETAILED DESCRIPTION OF THE INVENTION

Figure 1:
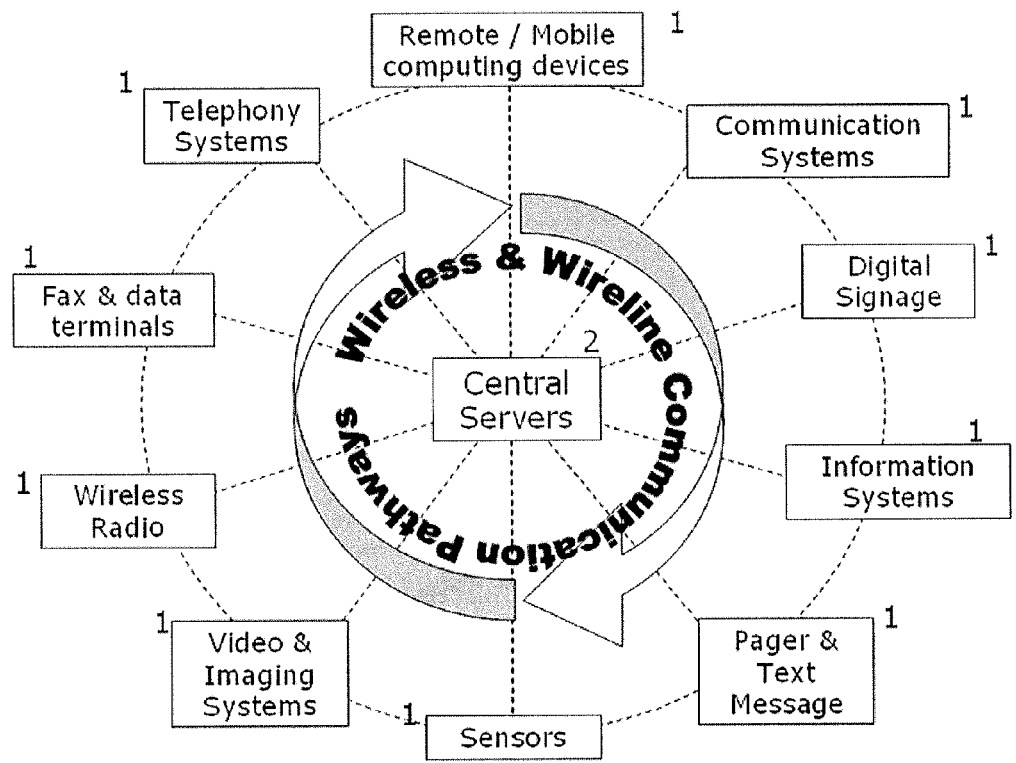
FIG. 1 is a schematic showing interoperability between dissimilar remote devices.

The present invention is described more fully below with reference to the accompanying drawings, in which preferred embodiments of the invention are shown. This invention may, however, be embodied in many different forms and should not be construed as limited to the embodiments specifically set forth herein. Rather, these embodiments are provided so that this disclosure will convey the scope of the invention to those skilled in the art. Like reference numbers refer to like system elements and method steps throughout.

The present invention is a converged telecommunications and information management system that offers interoperability between disparate voice, data, video, radio and machine-to-machine systems. An embodiment of the present invention comprises a unified communications system that enables the simultaneous creation, storage, display, edit, distribution, sharing, control and archive of voice, data, video and image communications from and to a plurality of remote devices through at least one of the aforementioned communications paths.

By integrating a diversity of communications architectures with separate service logic and delivery equipment, new communications and information services can be deployed without having to redesign telecommunication switches, remote display devices and network infrastructure to support said new services. This approach enables both large and small entities to be highly competitive as it facilitates deployment of service delivery solutions amongst service providers, making it easier and cheaper for a provider to offer its customers with more service choices.

The present invention offers significant advantages over prior art since it embodies through a single solution the ability to deliver a multitude of communications and information service solutions that seamlessly and simultaneously integrate a plurality of disparate remote devices and networks. This approach results in immediate on-demand service delivery, ad hoc communications and information management where infrastructure is unavailable, use of existing infrastructure and remote devices, low total cost of ownership, and unified messaging and workflow.

The present invention is comprised of several reusable modular components, each of which can be operated independently or in combination thereof to achieve specific end-user results. A variety of service solutions are provided, allowing for seamless integration of existing services and data networks, including proprietary platforms and permitting enterprise end-users to interconnect their traditional communications platforms, information management systems and existing software applications to new wireline and wireless delivery platforms. The present invention helps organizations manage day-to-day and mission-critical aspects of their operations through integration of all information, communications and processes into a single unified (converged) system. The present invention is also applicable to all basic functions of an organization, regardless of the organization's business or charter such as business, non-profit organizations, non governmental organizations, governments, academia, and other entities to include individual workflow.

Utilization of the present invention replaces two or more independent software applications and/or hardware systems, thus eliminating the need for external interfaces previously required between systems and resulting in real-time situational assessment of all systems and processes, continuity of operations, interoperability between humans and disparate machines, and improved reporting through a common operating picture. Additional benefits include, but are not limited to, standardization, lower maintenance, greater operational efficiency, reduced errors, quicker implementation of new or enhanced processes, lower life cycle costs, and simplified training Major components include a common user interface, unified database, rules based decision management system and network operations center which enable cross-platform, cross-industry and cross-function operations.

Real-time functionality enables the automated delivery and management of solutions in response to conditions presented by either human or machine interface. The present invention enables users to deliver and manage individual and facility-specific solution tasks, extend area and effectiveness of operations, provide security and non-security related acknowledgements, maintain battle rhythm, support unified communications for joint field offices, and enable each user (e.g., agency, business unit or individual) to build their own kingdoms and then at any time link each kingdom together both horizontally and vertically up the chain of command. The present invention provides real-time interoperability with existing mobile and wireline computers, communications systems, customer premise equipment, devices, systems, sensors, and public and private network. The core architecture results in a solution that is extensible, flexible, adaptable, scalable, reliable, malleable and highly secure to meet existing and future requirements and to interoperate with both existing and emerging communications and data systems Inherent design features empower users through a single interface that integrates core systems applications to include the management of documents, projects, tasks, expenditures, assets, personnel directories, personal contact information, telephony (public and VoIP), emails, facsimiles, pagers, text messages, instant messages, alarms, content, notifications, video, events, forms, calendars, users, visitors, message recipients, acknowledgements, resolutions, object level and individual security rights, usage, analog and digital machine-to-machine sensors, The present invention embodies through a single solution a multitude of features that eliminate the need for various disparate systems and simultaneously provide unique capabilities and significant enhancements in communications and information management.

The present invention is advantageous because it embodies through a single solution the ability to deliver a plurality of communications and information service solutions that seamlessly and simultaneously integrate a plurality of disparate remote devices and networks. This approach results in immediate on-demand service delivery, ad hoc communications and information management where infrastructure is unavailable, use of existing infrastructure and remote devices, low total cost of ownership, and unified messaging and workflow.

The present invention offers a real-time interoperable communications and information sharing platform designed with distributed network intelligence in centralized databases resulting in service delivery solutions that are independent of other networks and remote display devices. By integrating a diversity of communications architectures with separate service logic and delivery equipment, new communications and information services can be deployed without having to redesign telecommunication switches, remote display devices and network infrastructure to support said new services. The result is a unified system that can transform data into actionable communication and information displayed in a user friendly environment applicable to a wide-ranging menu of easily incorporated service options.

FIG. 1 illustrates interoperability between dissimilar remote devices via connection to a centralized server or hub via aforementioned communication paths. All remote devices 1 communicate with at least one central server 2 where said central server processes inbound information and distributes it to one or a plurality of central servers and/or remote devices. The interoperability depicted in FIG. 1 is attributed to a complex integrated system of servers, software, and communication paths. The term "central server" applies to one or more servers providing functionality for communications, information, and process management.

Figure 2:
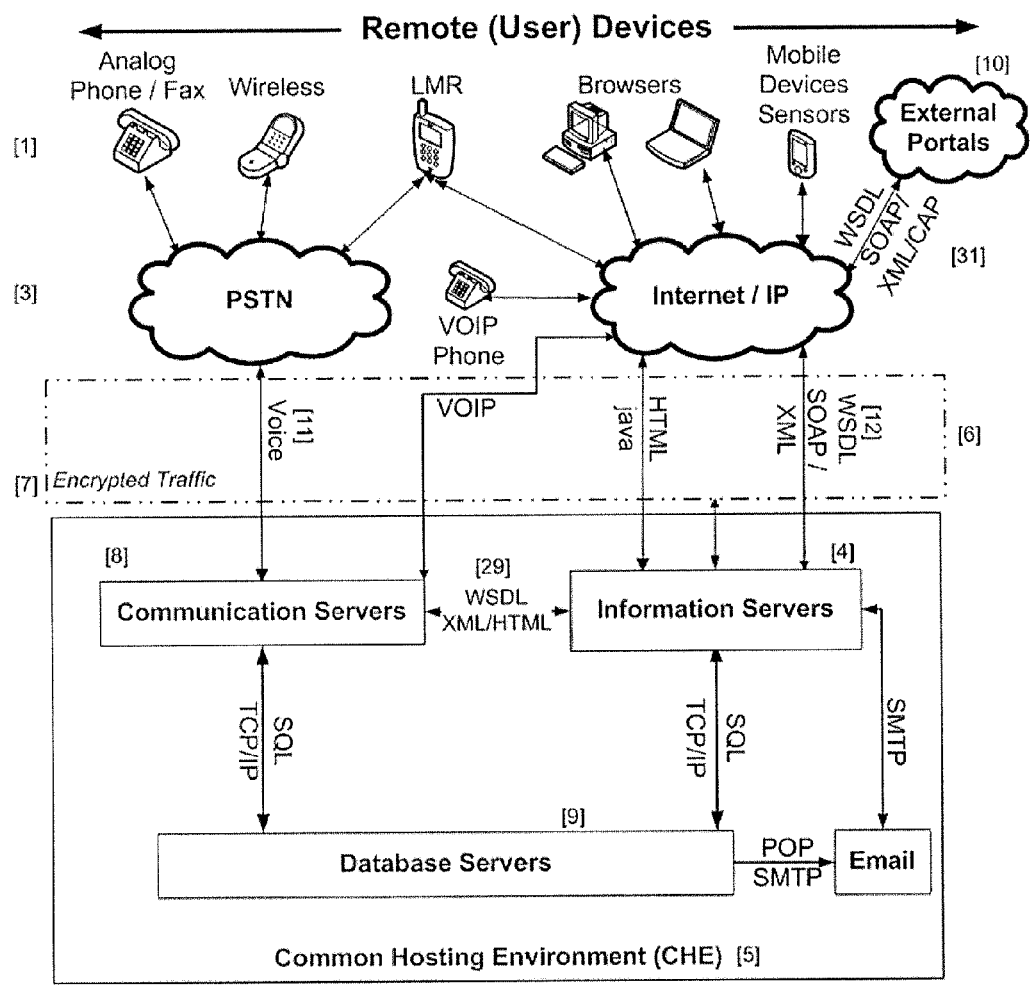
FIG. 2 is a schematic of an architecture for an embodiment of the inventive system and method.

The underlying architecture to achieve said interoperability is illustrated in FIG. 2. As shown in FIG. 2, the flow of how a plurality of remote devices 1 shares communications and information to, from and between each other via a combination of proprietary inventions and public and private networks. Communication and information requests from remote devices 1 are directed over a communication path 3 to an available information server 4 in the Common Hosting Environment (CHE) 5. The communication paths 3 include all voice, data, video and images transported via one or in combination of the following to include, but not limited to, the Public Switched Telephone Network, World Wide Web, Internet, Wireless Wide Area Network (WWAN), Wide Area Network (WAN), Local Area Network (LAN), satellite, land mobile radio, WiFi, Worldwide Interoperability for Microwave Access (WiMAX), broadband over powerlines and other wireline and wireless networks. The communications and information traffic 6 is encrypted 7 using an encryption engine and decrypted by either communication server 8 or information server 4. Requests from remote devices 1 reach the database server 9 where they are processed and then return a response to the requesting remote device 1 via a selected communication path 3 or direct a response to an external portal 10 which may also include an external device or service.

Inbound communications from a remote device 1 that is voice-enabled are trafficked via an appropriate communication path 3 to the communications server 8 for processing and return via aforementioned process. Communication requests inbound via the PSTN 3 may employ an existing dial plan on the communications server 8 to first authenticate and then select the communication method to be instantiated. The Dual-Tone Multi-Frequency (DTMF) signaling selection 11 is passed through the communication server 8 to the database server 9 where a knowledge manager associates the communications with a multi-mode response. In addition, a database record is generated and stored in a communications queue where a service acts upon said record for the purpose of supporting further communications and information sharing, processing and transport.

Communication requests inbound via IP-enabled device such as a mobile PDA 1 are passed to the information server 4 for processing in accordance with the aforementioned process for PSTN traffic. Communication requests inbound from remote data devices such as sensors 1 may constitute either analog or digital formats and communicate directly with a service listening for incoming requests 12. The incoming request is processed to identify the inbound source device and to respond as directed by the knowledge manager residing on the information server 9. The knowledge manager can also be directed to provide further action in the event that no inbound communications are received from a remote device for a given time period.

Through a service-oriented architecture, the present invention enables effective communication, data-sharing and activity coordination using remote devices 1 that are agnostic to hardware and software architecture or operating systems, offering interoperability between dissimilar communications protocols or devices and ensuring the integration of disparate and non-homogeneous information sources used in provisioning real-time solutions and common operating picture (COP) necessary for mission-specific operations. The resulting solutions are scalable, malleable, and extensible, providing cost-effective and rapid service delivery solution options to a variety of simple or complex problems. Technology features include an enterprise application environment for creating and managing integrated and increasingly sophisticated user-defined software products and services solutions via a simple to use Graphical User Interface (GUI). This approach effectively allows for enterprise-wide network management and integration of existing and emerging services including proprietary platforms over wireless and wireline networks. Typical services supported include:

Converged and managed voice, data, video and image applications accessible via said communications paths Integration with existing platforms, remote display and edge devices, systems and infrastructure Consolidated and secure communications and information transmission and storage Open standards architecture which permits seamless connectivity with existing and emerging disparate and third-party systems Ultimately providers of advanced communication and information networks are seeking to integrate new networks with existing and emerging applications solutions to allow for the development of increasingly sophisticated and specialized service delivery solutions. These solutions dramatically increase the added value to end-users. The present invention allows infrastructure providers and end-users to realize the full value of newly deployed high-speed wireless and wireline networks.

The present invention consists of several modular, reusable component systems and depending on the desired solution, may be comprised of several elements to include: 1) database, 2) telecommunications, 3) information management, 4) enterprise application environment, 5) mobile platform, 6) encryption, and 7) system applications. The enterprise application environment is used to develop templates and customized mission-specific applications derived from internal and external agents as related to the platform.

Service Delivery

The present invention provides a plurality of service delivery options that are categorized into three primary Levels of Service (LoS) as depicted in FIG. 3, being communications 13, information 14, and process management 15. LoS features provide the fundamental building blocks that can be managed to provide a variety of service delivery options for user-specific applications. LoS features illustrated in FIG. 3 are a limited representation of the systems overall capabilities. Additional LoS features can be augmented via interoperability with internal or external agents 10. Administrator controls permit concatenation of LoS features, thus facilitating management and deployment of complex and diverse solutions and to provide predictable service delivery via a variety of user interfaces, system applications and communication paths.

End user functionality is achieved via a simple selection of "mix and match" of LoS features including communications 13, information 14, and process management 15. Each one of the LoS delivery options available is operable independently or as part of a unified solution. Combining LoS features results in a wide-range of end user applications, all of which share the following commonality:

Resource Control—User or automated selection of available telecommunication and information distribution resources such as bandwidth transport, protocols, and edge devices Real-time Virtual Network Infrastructure—Provides a virtual wireless or wireline environment where no infrastructure exists "Least Cost" Network Efficiency—Multiple telecommunication and information sharing paths support least cost delivery options. Users can define what network they wish to use and what communication mode(s) is(are) most important in trafficking packet data Mission-critical applications—Ensures operational effectiveness of priority-ranked mission-critical applications such as communications and management of projects, documents, tasks, calendars and other enterprise operations Web Service Gateway—Provides a singular gateway for interoperability with external systems using a diversity of communication protocols and paths, said protocols to include, but not limited to, HTML, XML, CCXML, SOAP, WCTP, SMTP, SMPP, SIP, and VXML Security Rights Management—User access is controlled down to the object level through a sophisticated security model that is applied to all information contained within The present invention or derivative applications. The security model permits selection of graphical user interface templates, menus, and program features at the read, write, edit, delete and apply user levels. The security model enables or limits program application customization Extensible Foundation—LoS provides the fundamental framework for a fully integrated communication and information management infrastructure based on legacy and emerging systems and technologies Management Controls—Each LoS offers provisions to create, store, display, edit, distribute, share, control and archive specific LoS features with a plurality of simultaneous wireless and wireline remote display devices FIG. 3 depicts the communication features associated with the communications LoS 13. Based upon end user selection, communications are transported via at least one of the said communications paths 3. A primary goal of communications LoS 13 is to flow user-specific services on-demand or as alternative services when one or more paths within the infrastructure has been compromised.

Information systems LoS 14 enables information creation and management among a plurality of remote devices via any communication path. Based upon end user selection, information is transported via at least one of the said communications paths 3. Two primary goals of information systems LoS 14 is to enable multi-disciplinary information management operations for internal and external agents as a service delivery solution and to provide interoperability between the information services and the communication services.

Process management LoS 15 provides workflow and logical process operations that are applicable to any problem or process involving communications and information. Process management LoS 15 leverages data captured and transmitted through other LoS features to enable more efficient and accurate decision-making via expert systems, knowledge management and human decision processes.

Network Operations

Figure 4:
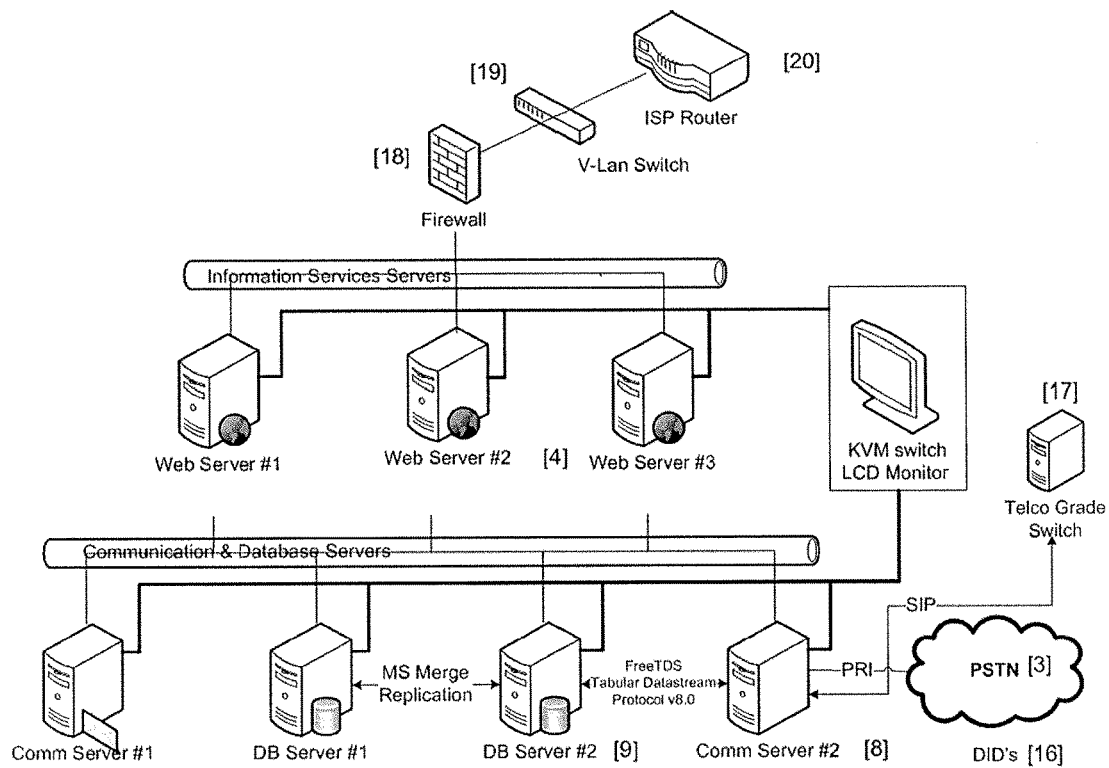
FIG. 4 is an example of an architecture for a managed network operations center.

Service delivery of LoS features 13, 14, 15 are delivered via a mesh grid of separately located Managed Network Operation Centers (MNOC), each of which is configured as illustrated in FIG. 4. Located within each MNOC is a combination of computer hardware, software and telecommunications equipment that constitute a CHE 5.

Open standards are incorporated which enable the MNOC, as shown in FIG. 4 to be interoperable with a plurality of internal and external agents and remote devices 1 that support protocols 6 compatible with said communication paths 3 and offer a display screen or ear-and-mouth port (for sound and recording) for presenting said communications and information to end users. Since the MNOC internally offers robust computational power and LoS, as shown in FIG. 3, the remote devices 1 can be very low-end, low cost technology systems.

Referring to FIG. 4, the communication server 8 is connected to the PSTN 3 via a Primary Rate Interface or other telecommunications standard for carrying multiple voice and data transmissions. The CHE 5 incorporates a block of Direct Inward Dialing (DID) numbers 16 for outbound and inbound communications. Large volume call capacity can be achieved by creating, modifying and terminating sessions with a Signaling System 7 (SS7) 17 network for setting up telephone calls and telephony services to include linking VoIP traffic 6 to the PSTN 3. Another circuitous traffic route is that inbound and outbound transmissions to and from the MNOC may pass through a firewall 18, a Virtual LAN (VLAN) 19 and a router 20.

The CHE 5 offers robust and flexible security services by locating an encryption engine 7 between the firewall 18 and the servers 4, 8, 9. This results in a highly sophisticated security service model capable of supporting various encryption algorithms such as Automated Encryption Standard (AES) and Federal Information Processing Standards (FIPS). This approach enables encryption algorithms to be easily interchanged without disruption to MNOC operations, provides secure operations for low-cost remote devices that are generally unsecured, and encrypts all packet data transmissions to and from the MNOC.

Figure 5:
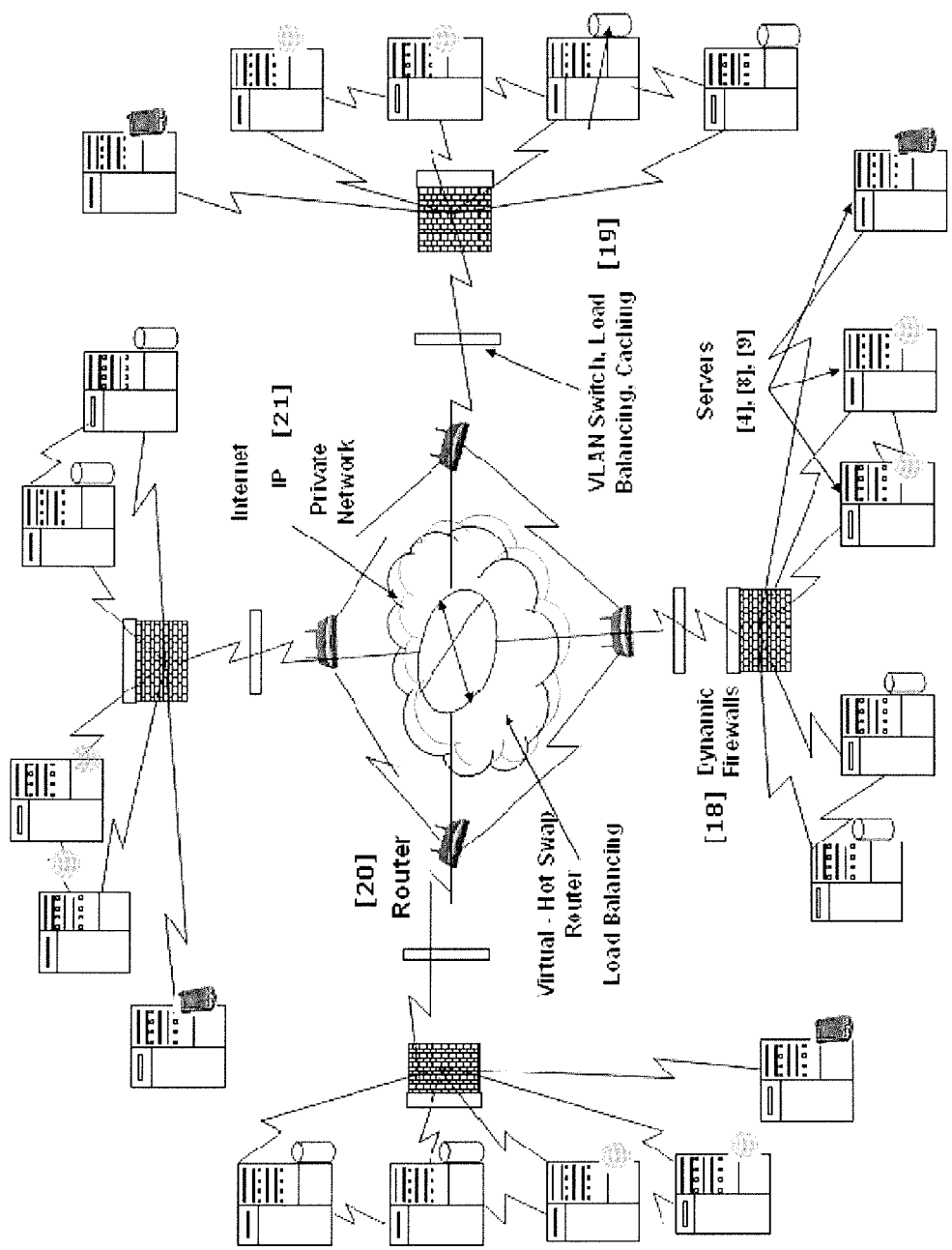
FIG. 5 is a schematic for an example mesh-grid architecture for a managed network operations center.

Scalability and reliability are achieved by interconnecting the CHE's 5 between MNOC's, as shown in FIG. 4 utilizing mesh grid architecture as depicted in FIG. 5. As utilization is increased, additional CHE's 5 can be interconnected to provide any LoS feature 13, 14, 15 without service interruption to the end user.

As shown in FIG. 4, the CHE 5 is consistently applied across all MNOC's, enabling "server farming" IP delivery of voice, data, video, and imaging communications. Delivery and scalable services are derived from a balanced partnership between multiple distinct domains, software and hardware. The result is highly scalable and reliable distributed LoS features as shown in FIG. 3. System flexibility to scale is achieved by either "up" or "out," referring to options to either increase server 4, 8, 9 capabilities or by interconnecting individual MNOCs as shown in FIG. 4. "Scaling up" takes advantage of multiple processors and large memory whereas by "scaling out" leverages the economics of using commodity server hardware to distribute the processing load across multiple servers in multiple network centers. FIG. 5 illustrates that the individual MNOC's are interconnected through the internet or private network 21 by passing through a firewall 18, a Virtual LAN (VLAN) 19 and a router 20.

As shown in FIGS. 4 and 5, scalability is further achieved by enabling LoS to maintain "state" across the servers within an individual MNOC or across MNOCs, resulting in infinite scalability across multiple, diverse and remotely located servers. The servers 4, 8, 9 contain a proprietary session manager that provides a lasting connection between systems that are internal and external to the MNOC. The proprietary session manager located within the servers identifies session state to include at a minimum a unique session ID and other information that is uniquely required for the software application such as, but not limited to, information about the remote device and user's preferences and authorization levels such as evidence-based security model. This approach eliminates the problems associated in maintaining session state between a plurality of servers and remote devices and enables server farming across windows-based and non-windows-based servers within each MNOC.

Communication Architecture

The core communication architecture permits maximum flexibility in supporting converged communications and information sharing. The present invention offers three primary methods for initiating converged messaging via interface with PSTN, internet, or direct IP connection. Upon initiation of converged messaging, at least one or a plurality of any LoS 13, 14, 15 or combination of LoS is simultaneously executed via said communications paths 3.

Figure 6:
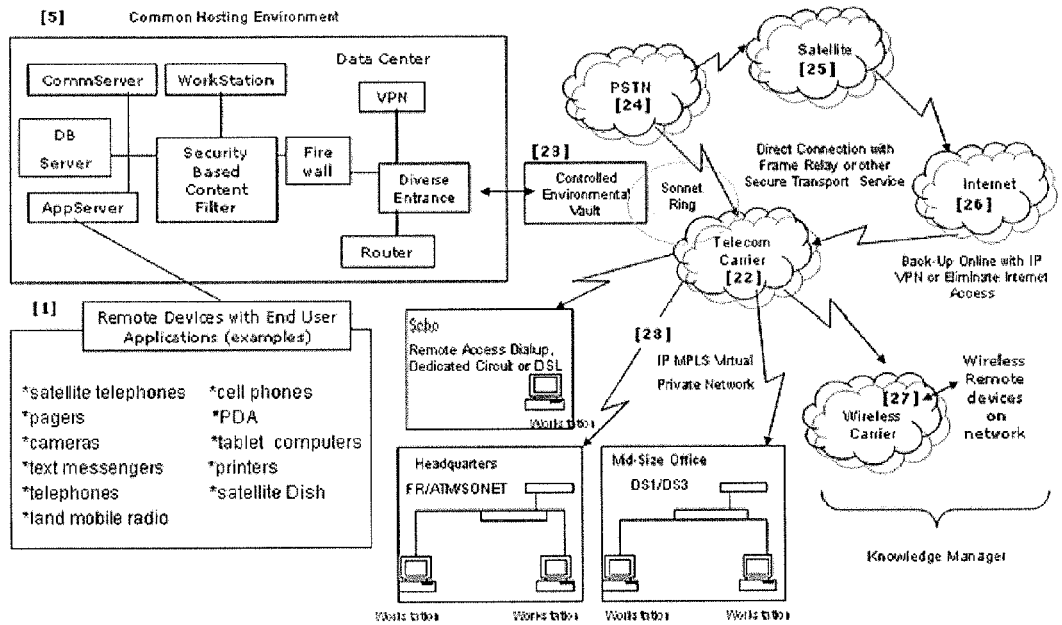
FIG. 6 is a flowchart for the integration of CHE with the public telecommunications infrastructure.

FIG. 6 exemplifies how the CHE 5 is interoperable with the public telecommunications infrastructure. In FIG. 6, the CHE 5 interacts with remote devices 1 that offer end users desired applications. The CHE 5 can be connected an external telecommunications carrier 22 for access to the public telecommunications infrastructure via a Controlled Environmental Vault (CEV) 23. The telecom carrier 22 must provision said CEV 23 for interoperability. Once the link is active, then the CHE 5 can provide LoS service delivery, as shown in FIG. 3 via said communications paths 3, with the exception that one or more of the said communications paths 3 are directed through the telecommunication carrier's communication network and may include carrier-specific transport such as PSTN 3, 24, satellite 25, internet 26, wireless 27, VPN 28.

Interoperability between diverse communication paths 3 is achieved by incorporating Application Programming Interfaces (APIs) that are defined around a central core communication system such as Private Branch Exchange (PBX). This design approach permits the core to handle the internal interconnection of a PBX cleanly abstracted from the specific protocols, codices, and hardware interfaces from the telephony applications. Any suitable existing or emerging telecommunications hardware and technology to perform essential functions of interoperability can be employed.

Incoming VoIP or PSTN telephony calls can be received by a PBX system which uses a dial plan for incoming call processing. The incoming dial plan consists of instructions and information that can be electronically created, stored, displayed, edited, distributed, shared, controlled and archived by a central server 4, 8, 9 or by an external agent 10. Generally, the incoming dial plan accepts incoming call information, processes the information, authenticates information received, and then takes further action or terminates the call. Similarly for outgoing voice calls, the outgoing dial plan can be triggered by any one of communication paths 3. The outgoing dial plan can be electronically created, stored, displayed, edited, distributed, shared, controlled and archived by a central server 4, 8, 9 or by an external agent 10. Dial plan instruction sets and additional information are input to the system via Web Services Description Language (WSDL) 12 or remote devices using a variety of formats to include, but not limited to, telephone keypad using DTMF, voice or data systems.

Figure 7:
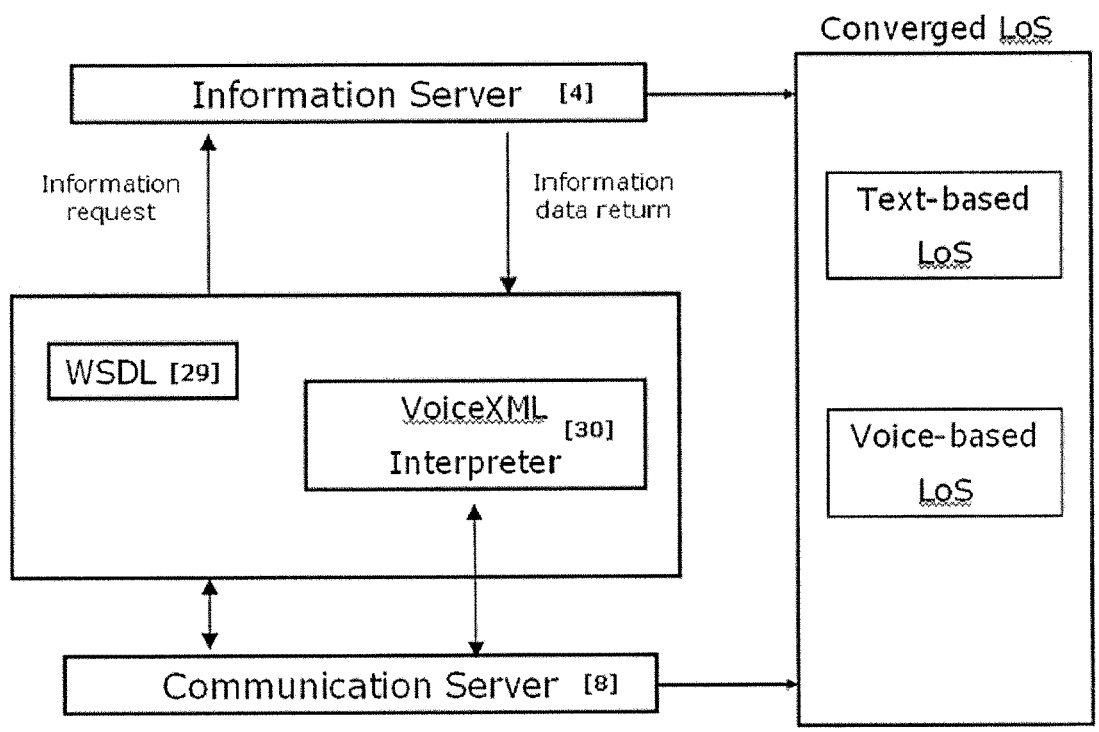
FIG. 7 is a flowchart illustrating the transfer between information and communications servers for an embodiment of the present inventive system and method.

FIG. 7 illustrates that the connectivity between information 4 and communication 8 servers are transacted either through WSDL 29 or the VoiceXML Interpreter 30 which directs voice and non-voice communications for further action. The WSDL 29 detects an incoming voice call which may have information requests typical of Interactive Voice Response applications. The WSDL 29 interacts with the voice telephone call and obtains data requests in real time. However, after the incoming call is identified and answered, the VoiceXML Interpreter 30 handles the voice and data dialog. The present invention handles the data acquisition and call status to include, but not limited to call initialized, keypad input received, answering machine detected, voice mail message delivered, and call disconnected. The information server 4 processes requests from remote devices 1 or agents internal and external to the CHE 5 or MNOC, as shown in FIG. 4. Information requests are received from the WSDL 29. VoiceXML interpreters 30 monitor request inputs in parallel with the WSDL 29. Incoming requests are appropriately routed to the communication server 8.

The result is an agent that can simultaneously at least one or a plurality of any LoS 13, 14, 15 or combination of LoS via said communications paths 3.

Primary Communications Process Flow

Two-way voice communications enable capable remote devices to provide communications and information exchange with the CHE. The communication flow is designed using the built-in knowledge and workflow manager which offers database-driven send and response capabilities using Interactive Voice Response (IVR) or DTMF 11. Outbound and inbound messages can be configured for any combination of message flow and can incorporate user level authentication. Once the initiation is authenticated, data are assimilated, formatted and sent to the notification manager for queuing. The notification manager distributes data to appropriate modules for additional actions. For example, once the queue record has been retrieved, the notification is executed. The process returns a list of filenames that support the dial plan. Some examples include; 1) directing DIDs 16 to the call manager in support of a given dial plan, 2) directing email addresses to the email server 3 sending SMS text messages 12, 29, 31 to the appropriate WSDL for distribution, sending pager information 12, 29, 31 to the appropriate WSDL for distribution, and 3) sending task information to specific individuals for personnel management.

FIG. 8 provides a representative example of an automated communications process flow as applied to an alert notification application. The communications process flow is customizable for delivering one-way and two-way communications and information. In the example of FIG. 8, the communication flow is customized for initiating an alert notification, but the process is applicable to any application that requires a plurality of automated telephone calls. Specifically, FIG. 8 addresses utilizing the present invention as a part of a response plan to an event. In this case, the invention enables automated communications triggered from an inbound PSTN or VoIP telephone call into the communications server 8. Automated communications plans are linked with inbound DID numbers 16 which are associated with a dial plan that controls communication flow. Call initiation is authenticated by a numeric security code 32. The recipient security code is replayed 51 for authentication and validation 33. The caller must enter a valid extension or is requested again to authenticate 35. To confirm a launch code the caller enters a numeric identifier on the telephone keypad and a "2" is entered to reenter a launch code. The caller is prompted again for an authorization code if the entered code is found to be invalid 38. The entered launch code and CallerID is compared to available codes in the database for the CallerID 33. This process is repeated up to a selected maximum number of occurrences 34, whereby if exceeded 36 the call is disconnected 44. Once authorized 37, the caller is played a caller-specific menu and asked to select the unified LoS messaging event to initiate 39. The entered selection is compared to valid extensions 40 for authentication 41. Once authenticated, a record is generated in the unified LoS message event queue 42, the unified LoS message initiation is successfully completed and automatically triggers said unified LoS messages pending in the queue for text-based LoS messages 45a, 14, 15 and voice-based LoS messages 45b, 13.

For each dial plan, there exists a simple or complex Interactive Voice Response (IVR) or a DTMF 11 call flow. The dial plan call flow depicted in FIG. 8 represents a customizable data-driven process where each instruction set contains many channel variables which define the form and function of the dial plan. The channel variables receive their data via the WSDL 29 which communicates to the database. User controls are provided via a remote device 1 for data or voice interface.

Figure 9:
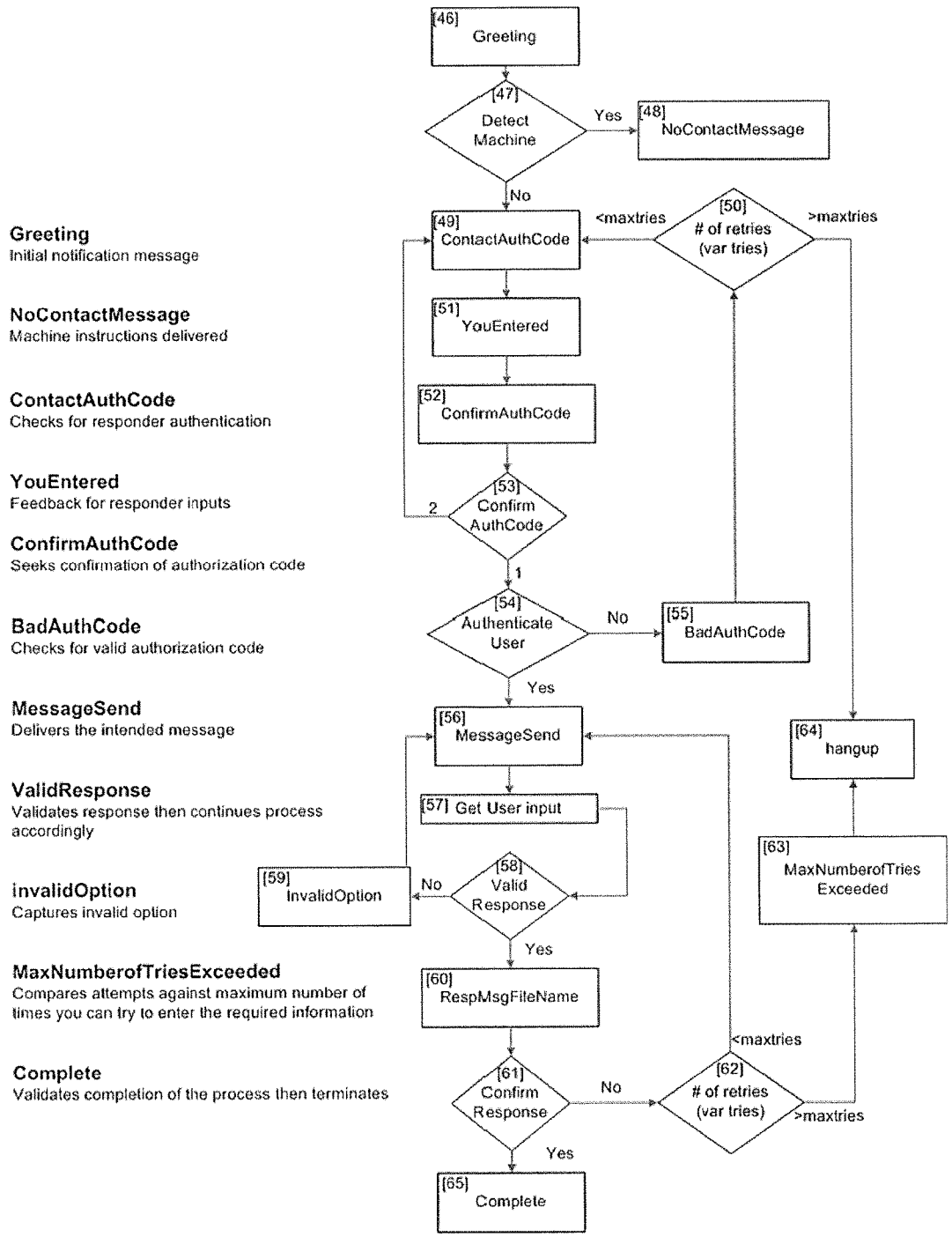
FIG. 9 is a flowchart of an embodiment of the inventive system and method for a dial plan call flow.

Whereas FIG. 8 exemplifies the initiation of an alert notification, FIG. 9 represents the actual voice messaging process post initiation. In FIG. 9, voice calls are made to all call recipients defined as contacts stored in the database server 9. Each contact is played a greeting 46. Simultaneous with the delivery of the greeting, a listener monitors both the silence and background noise over the connection. Based on parameters stored in a knowledge manager, if the listener determines that a machine (e.g., answering machine or facsimile) or other non-human device has answered the telephone call, then an alternate message or action is initiated 48. If a human recipient is detected, a query requesting input for an authorization code 49 is delivered. The recipient security code is replayed 51 for authentication and validation 52. This process is repeated up to a selected maximum number of occurrences 55. Once authenticated against information stored in the database server 9, the notification process continues. The main message is delivered 56 and a response is prompted 57. Only valid extensions are allowed 59. If a valid extension is entered 48 the contact response is played back 60 and confirmation is required 61. A defined number of confirmation attempts is permitted 62. If exceed, the notification process is disconnected 63. Once the response has been authenticated, the notification process continues or is ended 64.

IP Communication Process Flow

The primary communication process by and between internal and external agents is via WSDLs, permitting voice and non-voice (e.g., text) transmissions over said communication paths 3. Since certain external agents (e.g., remote sensors) are unable to communicate via a WSDL format, a TCP/IP socket interface "listener service" is employed that can receive a transmission using an anonymous or authenticated access control process. The listening service detects communication activities and then generates a unique data record identifier associated with each new transmission by external agent and transmits and stores said data from said external agent via said communication paths 3 and database server 9, respectively. A separate service compares said stored data against rules stored in the knowledge manager and acts accordingly to initiate a Converged Event Notification LoS (CENL) which is a notification process comprised of a least one or a plurality of LoS features 13, 14, 15. Said data record identifier includes external agent properties to ensure proper association between triggering external agent and the CENL. For example, external agent properties include unique identification in any format that exactly identifies the device generating said data. The listener service enables continuation of process actions after the data record identifier is generated. Hence, CENL features can be initiated via data streams issued over a TCP/IP socket interface.

Unified Message Campaigns

A unified message campaign consists of a combination of selected LoS features, said LoS features having associated properties and recipients, said recipients defined as humans and remote devices. System design has the flexibility to formulate unified message campaigns based on rules defined in a knowledge manager or to select from pre-defined message templates. The objective of the campaigns is to deliver specific voice and non-voice messages, instructions and LoS to remote devices for interpretation and potential further action by other remote devices or humans.

Unified message campaign properties are formatted in accordance with the individual remote device or human receiving said message. Unified message campaigns can contained nested functions such as specific dial plans for voice systems or message plans for text-based systems. Each nested notification contains nodal functions and procedures that collectively define the entire nested process. A node consists of individual actions on an instruction set. The nodes are finite instruction sets directed as machine-to-human or machine-to-machine commands. Hence, the "listener" or recipient can be human or machine and can provide real-time feedback to any node operation within a notification campaign.

Communications Process Flow

Automated management of the communication process flow includes pre-compiled commands and a knowledge manager that responds to certain conditions. This approach results in communications controlled by data-driven events which are populated via internal and external agents. A knowledge manager provides typical automated process flow, exemplified below:

1) A notification request is placed to appropriate remote device
2) An authorization code is collected and verified
3) A connection to database server (9) is established and the process is initiated
4) Using the information collected, a second database connection to the information server is established
5) The communication plan is initiated and the appropriate data record identifier is established
6) Individuals, groups, facilities and other entities involved in the communication plan are identified
7) The record identifiers are used to initiate a notification process and queue the data records in a spool directory
8) The spool directory is sent to the communications process manager which simultaneously initiates voice-based LoS notifications and text-based LoS information in accordance with rules defined in the knowledge manager
9) Once a data record is initiated in the communications process manager, a unique data record is generated
10) The communications process manager monitors the transaction log event to ascertain notification status. The status indicator is used to drive additional unbounded instruction sets in the communications and information LoS processes.

Call Status Identifications

The ENS replies to the request message after it has validated content. The reply provides information pertaining to the results of interim steps within the communication process. Some typical identification codes include:

4, 8, 9. This results in a highly sophisticated security service model capable of supporting various encryption algorithms such as Automated Encryption Standard (AES) and Federal Information Processing Standards (FIPS). This approach enables encryption algorithms to be easily interchanged without disruption to MNOC, as shown in FIG. 4 operations, provides secure operations for low-cost remote devices that are generally unsecured, and encrypts all packet data transmissions to and from the MNOC.

High-level security is achieved through at least one or a combination of CHE 3 infrastructure design, external security such as browser-based encryption, server side encryption, and incorporation of a secure server environment that operates in a demilitarized zone (DMZ) within the CHE 5. The DMZ, which can be represented by the encryption engine 7 or as algorithms stored on the servers 4, 8, 9, is a network area that sits between an organization's internal network and an external network and encapsulates advanced software encryption for enhanced security in sending and receiving packet data. A special dedicated encryption server can be provided as a dedicated machine on the DMZ. This architecture separates the platform from the external agents such as client machines accessing the invention via the Internet. Thus, access is securely controlled from the encryption server to the various internal machines and IP address space at each MNOC.

System users can select the desired encryption through an interface between their remote device 1 and the information server 4. This selection directs the traffic flow to the appropriate encryption engine, either through the DMZ or server-side algorithms.

Continuity of Operations

The present invention employs several strategies to ensure fail-over and fail-safe operations in the event of failure of internal or external systems or infrastructure. Three methods are clustering, replication and automated standby servers, with clustering as the primary method. The CHE architecture includes both failover clustering and load-balance clustering. The database servers can also use replication to obtain data transfer between all servers at all MNOCs.

| | |
|---|---|
| ACK—Contact Acknowledged | NOA—No Answer |
| AFG—Acknowledged by Fax Gateway | NPG—Message not Acknowledged by Gateway |
| AMD—Answering Machine Detected | |
| APG—Message Acknowledged by Gateway | QUE—Message Queued for Delivery |
| | RED—Message was read on pager |
| BEG—Begin Call | RPY—Pager Reply Sent; |
| BSY—Busy Line | SFG—Sent to Fax Gateway |
| CON—Congestion | SMT—Sent to Gateway using SMTP Protocol |
| CTF—Contact Failed | |
| End—End Call | SPG—Sent to Pager Gateway |
| HUP—Hang Up | STP—Message Sent to Pager |
| IRC—Incorrect Response Code | TMO—Timeout |
| NCK—Contact Negative Acknowledged | UCR—Unconfirmed Response |
| NFG—Fax not Acknowledged by Gateway | VMM—Voicemail Message left |
| | WCT—Sent to Gateway using WCTP Protocol |

Security

The security model employs an encryption engine for converged telecommunications and information transport and storage, resulting in a highly secure collaboration platform that is flexible to change security models without effecting overall system operations. Accordingly, security is maintained on the IP platforms and on the communications links interacting with the system.

As previous illustrated, within the CHE 5 an encryption engine 7 is located between the firewall 18 and the servers Replication is the process of distributing data from Publisher to Subscribers, allowing the Publisher and Subscribers to make updates while connected or disconnected, and then merging the updates between sites when they are connected. The present invention achieves data protection by incorporating clustering, replication or automated standby server methodology. These approaches are traditionally used in the IT industry, however modifications have been made to the replication process to improve the performance within the environment.

Traditional replication allows various sites to work autonomously and at a later time updates data into a single, uniform result. The data are synchronized between servers continuously, at a scheduled time, or on demand. Because updates are made at more than one server, the same data may have been updated by the Publisher or by more than one Subscriber. Therefore, conflicts can occur when updates are replicated. To avoid these conflicts, a resolver is invoked by the replication agent and determines which data will be accepted and propagated to other sites. Replication requires that every table must support a primary key and a Guaranteed Unique ID (GUID). The Replication Process (TRP) is a modification of the traditional replication process to uniquely work within the converged environment. TRP utilizes a modified GUID numbering system to prevent data collision between replicated databases. This is accomplished by introducing "seed data" that establishes the starting place, range and increment for numbering records within each server. In this manner, the converged data are replicated within and across MNOCs, as shown in FIG. 5.

Knowledge Management

A Decision Support System (DSS) is incorporated that offers a powerful expert system and knowledge management tool that captures, analyzes, and disseminates business intelligence for faster and better decision-making as applied to user-specific problems. The DSS provides two primary modes for aided or automated of decision support: 1) Knowledge Manager Mode (KMM), and 2) Behavioral Prediction Mode (BPM). DSS provides a real-time mechanism for automating repetitive tasks, providing definitive answers to specific questions and offering predictive modeling behavior for questions with unknown answers. DSS is configured by end users to resolve user-specific applications.

Figure 10:
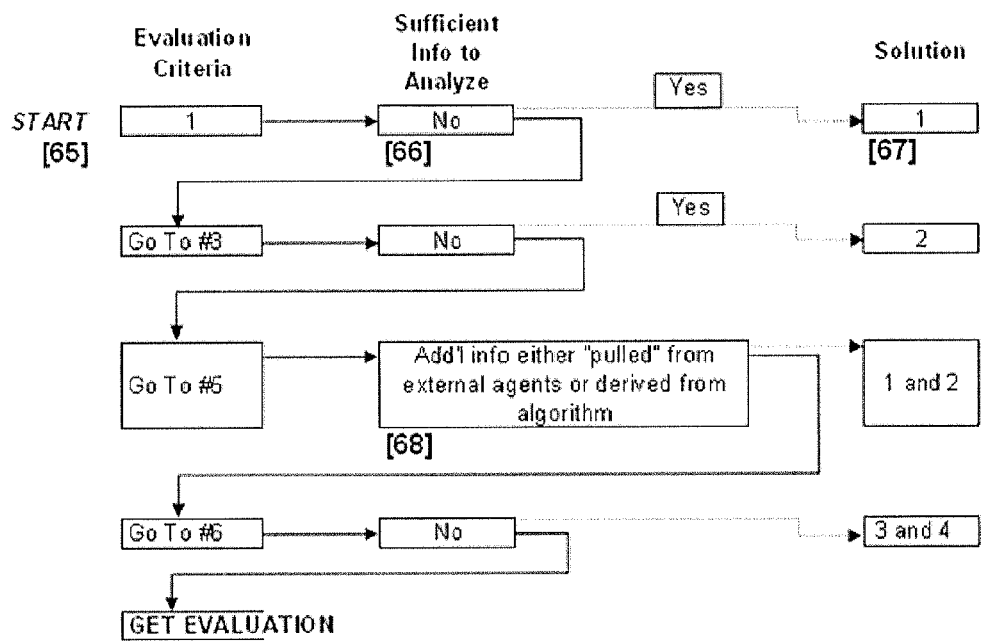
FIG. 10 is a flowchart illustrating the process flow for decision support for an embodiment of the present inventive system and method.

FIG. 10 illustrates an example process flow for decision support. An agent 65 passes a request for information to DSS for processing by either KMM or BPM. Either mode returns a result back 66 to the present agent responsible for the initial request. Once the information is contained within the database, the result 67 is available in accordance with its security model.

Queries presented by either internal or external agents are assessed by either a KMM or BPM approach. Acceptable assessments are processed for a solution and response. Unacceptable solutions trigger queries to obtain additional information which are then used for re-evaluate the data and develop another solution 68. The KMM mode offers an automated rule-driven, knowledge-based expert system where the corresponding database is either pre-populated or dynamically populated with each use. The BPM mode 4 offers intelligent algorithms for modeling behavior and predicting outcomes, analogous to neural networks. BPM utilizes a modified form of advanced mathematical optimization and predictive modeling techniques. One such mathematical model is Singular Value Decomposition (SVD), which processes user-specific information in real-time. The process is repeated until all queries are answered or a solution is achievable. Queries can be in the form of simple questions or can be more complex, containing multiple parts or entire query groups each with weighing factors. The weighing factor or "weight" represents the impact of the result to each of the contributing parts of a query. It signifies the overall importance of a partial solution to the total solution. Queries may contain images or hyperlinks to internal and external information or agents. Also, base answers can be established which serve as conditional guidelines, boundary conditions, sanity checks or conformance for solutions.

Figure 11:
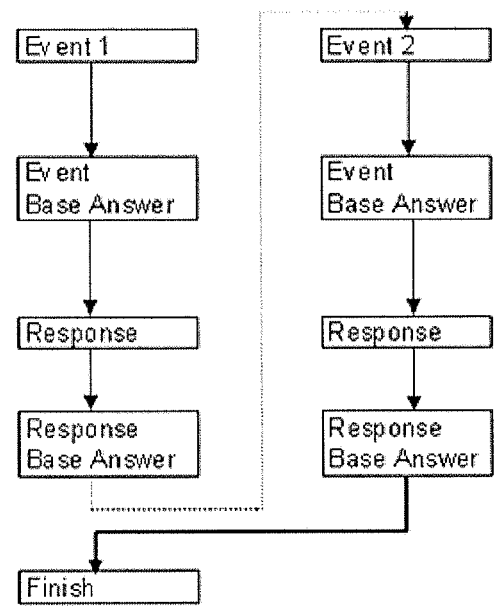
FIG. 11 is a flowchart illustrating the compilation of the knowledge manager for an embodiment of the present inventive system and method.

FIG. 11 provides an example of compiling the knowledge manager database. The program flow in this case is for queries whose solutions are contained within the known realm of the populated database. Queries can be individually generated or obtained from internal or external agents to include, but not limited to, help desks, customer relationship management systems, workflow manager, project-based systems, and frequently asked questions. Parametric responses and corresponding solutions are associated with queries.

DSS gains its intelligence by populating a database that represents all known and predicted permeations of selected processes including all solutions, failure modes, damage modes, effects, criticality analyses, and corrective actions. Data population occurs from both internal transactions and external data feeds. When BPM is invoked, the applicable data are used as the foundation for establishing trends based on user-selected parameters. Generally, greater accuracy in the predictive methodology is achieved with more largely populated databases.

Sensor & Machine-to-Machine Systems

The present invention provides a convenient and effective method for two-way communications between centralized server and external sensors or machine-to-machine (M2M) systems 1. The system provides a seamless interface via transfer of said communication paths. This results in interoperability with any remote analog or digital device and the central server. Typical applications include security systems, equipment and machine monitoring, automated vehicle location, point-of-sale, and field force automation.

Figure 12:
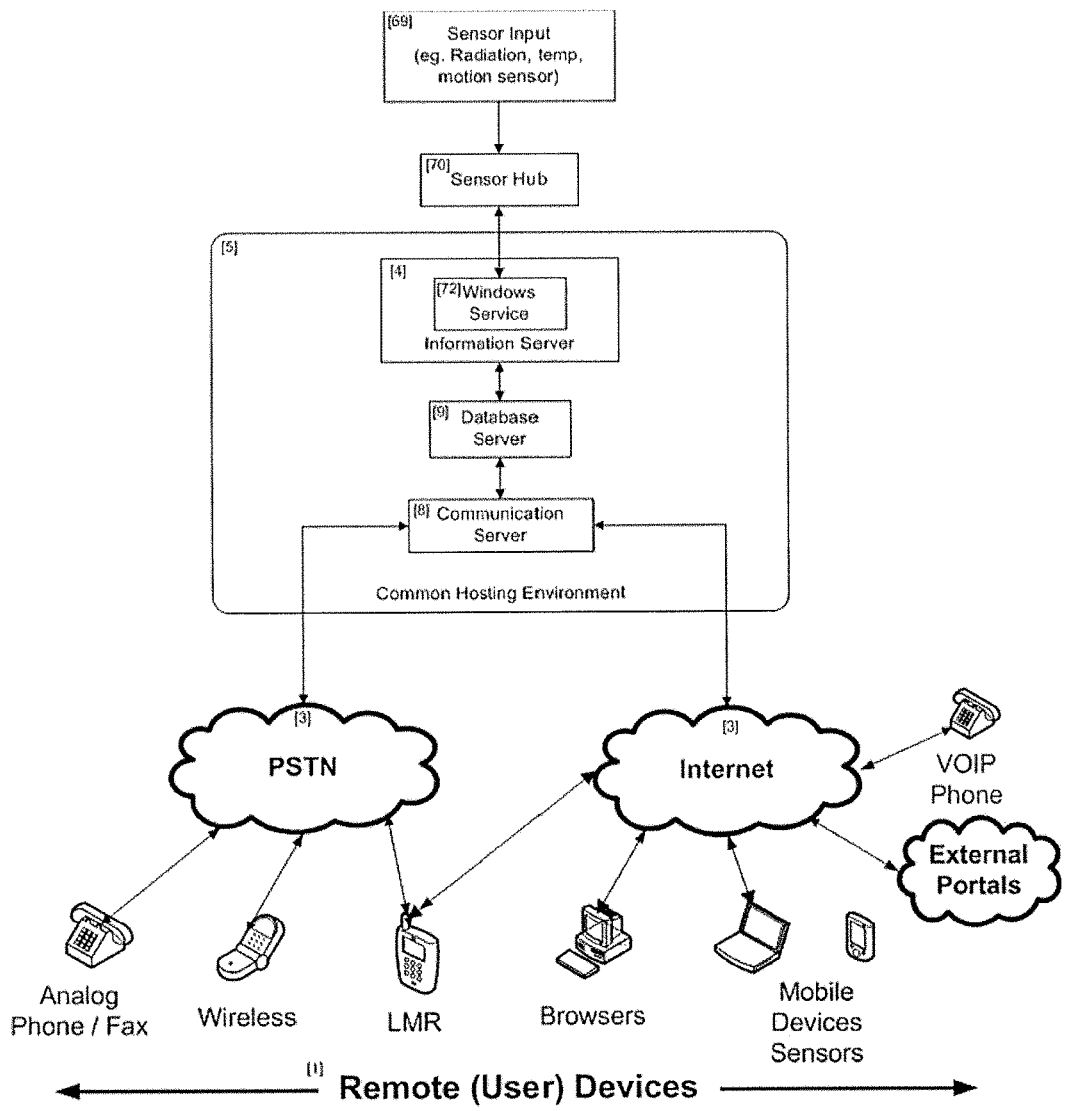
FIG. 12 is a schematic showing the remote sensor process flow for an embodiment of the present inventive system and method.

FIG. 12 illustrates sensor process flow whereby analog and digital inputs from sensors 69 attached to the sensor hub 70 are sent via a communications connection to the windows service 72 residing on a server 4 in the CHE 5. The windows service 72 parses the data from the controller 70 and based on the unique id and organization sensor cross reference table generates an incident queue record for a given organization. Triggers in the unified message campaign tied to the sensor are used to decide when a specific type of incident should be generated from the raw data coming from the sensors (e.g., temperature value exceeds maximum defined temperature limit). The appropriate communication path 3 delivers the unified message campaign. For bi-directional communication the delivery path is reversed and responses from remote devices 1 are delivered to the CHE 5.

Interoperability with various analog or digital sensors and machines include, but are not limited to bio-metrics, temperature, motion, vibration, light, liquid, sound, radiation, energy utilization, air quality, and environment. Once the remote device or sensor data is stored in the database server, said data can be manipulated as if the data were obtained from any other source.

Single Entry System

The present invention offers a unified user interface that is extended to a plurality of diverse remote devices 1. This significantly simplifies information and communication input and output. This unified interface is possible through a single sign-on or login which is authenticated across all modules that comprise the CHE 5. The information servers 4 enable portal creation and management of LoS features 13, 14, 15, permitting data to be assimilated, analyzed and distributed. This enables database server 9 population from internal and external agents which can be shared across all converged modules in the CHE 5 or across MNOCs, as shown in FIG. 5.

Figure 13:
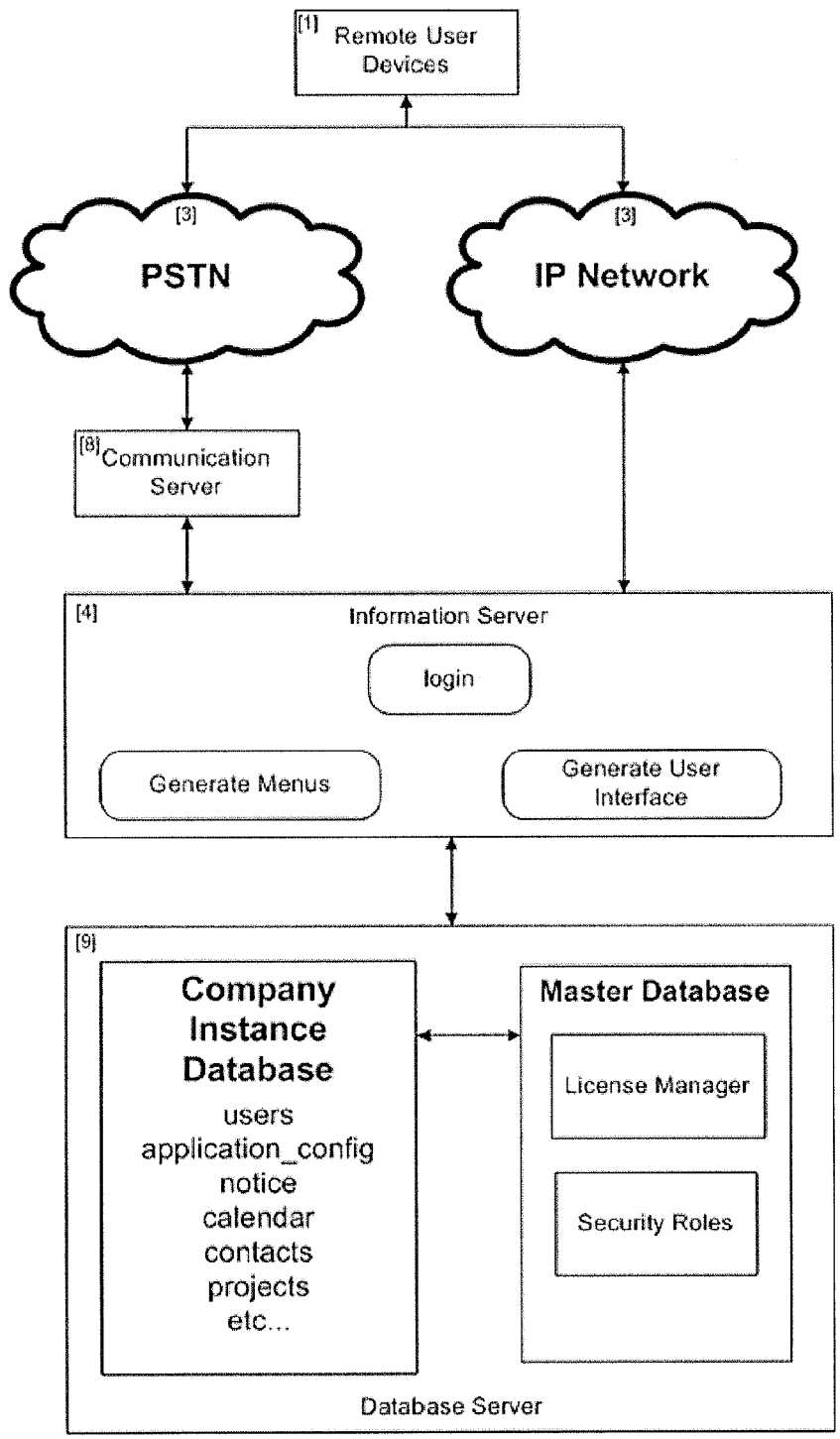
FIG. 13 is a schematic showing single sign-on collaboration for an embodiment of the present inventive system and method.

FIG. 13 illustrates interoperability between modules using a single sign-on login. Users access the present invention through any remote device. Remote devices 1 are able to login to the application via appropriate communication path 3. The present invention requests a combination of security codes or alphanumeric from users to authenticate their access to any LoS feature. For voice telephony, login is achieved by authenticating CallerID, speech-to-text translation, or DTMF.

Each user is unique to the systems, and once login is authenticated, user system properties are used to generate the user interface and LoS features available to the user based on security right permissions and authorized system licenses. Once authenticated, the user is able to move freely between all licensed modules within the application.

The above detailed description teaches certain preferred embodiments and examples of the present inventive system and method for a comprehensive integration between communications systems and information management systems where such systems include real-time two-way communications and management controls of a plurality of remote devices from any given remote device; identification of individual and event-specific workflow and content; object level rights management security; voice, data, video and image solutions delivered as services; and converged or unified automated message handling. While preferred embodiments and examples have been described and disclosed, it will be recognized by those skilled in the art that modifications and/or substitutions are possible and such modifications and substitutions are within the true scope and spirit of the present invention. It is likewise understood that the attached claims are intended to cover all such modifications and/or substitutions.

What is claimed is:

1. A method of managing how electronic files are created, stored, viewed, edited, distributed, shared, controlled and archived by a plurality of users from a plurality of remote devices, wherein the electronic files are of an occurrence of a previously identified or calculated event which is maintained within a plurality of remote devices, the method comprising the steps of:

after the detection of an occurrence of a previously identified or calculated event, creating a virtual space on a centralized server;

transmitting at least one electronic file, which contains at least one electronic file property, via a communication link to said centralized server that stores the electronic file and electronic file property;

receiving and processing said electronic file and electronic file property on said centralized server over said communication link, wherein said centralized server contains a user rights manager that identifies access control capabilities for a plurality of remote devices to act upon said electronic file;

assigning said electronic file by an automated method to a plurality of authorized remote devices wherein said assigning step is performed automatically without human intervention;

wherein the electronic file and electronic file property associated with the previously identified or calculated event is grouped to form a project, the project defined by task properties, and the task properties include at least:

a project creator name, a project name, a creation date, a status, a start date and time, a target completion date and time, an actual start and completion date and time, a target and actual budget, a description, a charge number, a percentage completion, one or more assigned contacts, a plurality of notes, a plurality of tasks and sub-tasks, individual tasks and an overall project status, and notification information; and wherein the electronic files can be edited, deleted and appended by the authorized remote devices.

2. The method of claim 1, wherein said electronic file is subjected to a configuration control system whereby after each occurrence that said electronic files or electronic file property are edited, the electronic file is automatically indexed and archived, for later recall to determine the change made.

3. The method of claim 1, wherein said electronic files and electronic file property are managed through a central user interface.

4. The method of claim 1, wherein said electronic files and electronic file property are moved from said virtual space on said centralized server to a different virtual space on said centralized server or another centralized server.

5. The method of claim 1, wherein said electronic files and electronic file property are automatically communicated in whole, in part, or edited by an authorized remote device, to a plurality of authorized remote devices via any of the following communication paths: PSTN, wide area networks, local area networks, the internet, satellite network, and broadband over powerlines.

6. A method of for providing electronic data files that are created, stored, viewed, edited, distributed, shared, controlled, and archived by a plurality of users from a plurality of remote devices, wherein the electronic data files are of an occurrence of a previously identified or calculated event which is maintained within a plurality of remote devices, the method comprising the steps of:

after the detection of an occurrence of a previously identified or calculated event, creating said electronic data files, wherein said electronic data files comprise data properties;

transmitting said data properties via a communication link to a centralized server for storage;

receiving and processing said data properties on the centralized server over said communication link, wherein said centralized server includes a user rights manager that identifies access control capabilities for a plurality of remote devices to act upon said electronic data files, wherein said centralized server further includes an automated method for communicating said electronic data files or said data properties to said plurality of remote devices;

assigning said electronic data files by an automated method to a plurality of authorized remote devices wherein said assigning step is performed automatically without human intervention;

wherein the electronic data files and data properties associated with the previously identified or calculated event are grouped to form a project, the project defined by task properties, and the task properties include at least:

a project creator name, a project name, a creation date, a status, a start date and time, a target completion date and time, an actual start and completion date and time, a target and actual budget, a description, a charge number, a percentage completion, one or more assigned contacts, a plurality of notes, a plurality of tasks and sub-tasks, individual tasks and an overall project status, and notification information; and wherein the electronic data files can be edited, deleted and appended by the authorized remote devices.

7. The method of claim 6, wherein said data properties are managed through a central user interface.

8. The method of claim 6, wherein said data properties are integrated with a real-time converged communications and information system.

9. The method of claim 6, wherein said electronic data files and data properties are automatically communicated in whole, in part, or edited by an authorized remote device, to a plurality of authorized remote devices via any of the following communication paths: PSTN, wide area networks, local area networks, the interne, satellite network, and broadband over powerlines.

10. The method of claim 6, wherein:
said electronic data files comprise electronic calendar events; and
said data properties comprise event descriptions, modifying existing events, checking events sent, checking events received, assigning zero or more attendees, checking attendee availability, identifying for public or restricted viewing, setting periodic reminders and communication methods, assigning event manager, identifying start and finish date and time, and assigning notifications.

11. The method of claim 6, wherein:
said electronic data files comprise electronic contact directories; and
said data properties comprise contact names, a plurality of communication addresses, said addresses representing physical locations and voice, data and video locators unique to a given contact, assignment to one or more individuals or groups of individuals, identification of contact manager, alternate contact information, notification information, a plurality of activities, and a plurality of notes.

12. The method of claim 11, wherein said data properties are copied and assigned to a new contact name.

13. The method of claim 6, wherein:
said electronic data files comprise voice, data, and video communications; and
said data properties comprise plan properties including a plan name, a description, a creator, a type, an identification, activation and deactivation dates, and a notification method.

14. The method of claim 13, wherein said notification method comprises a non-voice text-based message format, and creates a default textual description or override of said default textual description with a customized textual description unique to said individual contacts, groups and/or remote devices.

15. The method of claim 13, wherein said notification method comprises a voice-based message format, and creates a communications campaign, wherein said communications campaign is comprised of:
creating a plurality of voice messages, said voice messages stored on the central server; selecting at least one of said voice messages to be distributed via said communication path; and
delivering said at least one of the voice messages in accordance with said communications plan.

16. The method of claim 15, wherein at least one of said plurality of voice messages includes concatenating multiple voice messages resulting in a single unified message.

17. The method of claim 6, wherein:
said electronic data files comprise electronic forms; and
said data properties comprise plan properties including a label name, a form field name, a unique identification number, an element, a cell, a table, a data binding, a database definition, display parameters, an assignment to one or more individuals or groups of individuals, a security role, a state, a form manager, a workflow manager, and a publication manager.

18. The method of claim 17, wherein said workflow manager contains manual and automated processes to facilitate form creation, automatically bind said data properties to a centralized server database for distribution to a plurality of remote devices, and manage said form process through publication, data collection and reporting.

19. The method of claim 17, wherein said publication manager controls posting forms to a specific URL address, forms management, forms archive and restore, and user rights management.

20. The method of claim 17, wherein said data properties are assigned to a template manager for reuse in whole or in part by a plurality of users.

21. The method of claim 6, wherein:
said electronic data files comprise electronic financial accounts; and
said data properties comprise accounting classification and transaction controls for funds, payments, receivables, costs, and reporting.

* * * * *